United States Patent Office 3,078,256
Patented Feb. 19, 1963

3,078,256
PRODUCTION OF UNSATURATED COMPOUNDS
Georg Wittig, Tubingen, and Horst Pommer, Ludwigshafen (Rhine), Germany, assignors to Badische Anilin- & Soda-Fabrik Aktiengesellschaft, Ludwigshafen (Rhine), Germany
No Drawing. Filed Sept. 13, 1955, Ser. No. 534,156
Claims priority, application Germany Sept. 24, 1954
20 Claims. (Cl. 260—666)

This invention relates to a new and very broadly applicable process for the production of conjugated unsaturated compounds.

It relates further to a process for converting organic compounds containing aldehydo or keto groups into unsaturated compounds which contain a new C=C linkage instead of the C=O group of the starting aldehydo or keto compound allowing thus to lengthen the carbon chain of the starting materials.

The new process comprises converting a quanternary phosphonium salt into a so-called phosphonium ylide by means of a reagent which can remove hydrogen halide, adding an aldehydo or a keto compound to the ylide thus produced and removing the phosphine oxide produced as a by-product from the reaction mixture.

The reaction may be formulated for example in the case of using triphenyl benzyl phosphonium bromide, phenyl lithium as the reagent which can remove hydrogen bromide and cinnamic aldehyde as the starting materials, as follows:

(a)

$$[(C_6H_5)_3\overset{+}{P}-CH_2-C_6H_5]Br^- + C_6H_5Li \longrightarrow$$

$$(C_6H_5)_3\overset{+}{P}-\overset{-}{C}H-C_6H_5 + C_6H_6 + LiBr$$
$$\text{I}$$

(b)

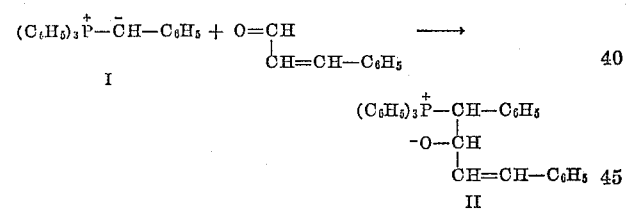

(c)

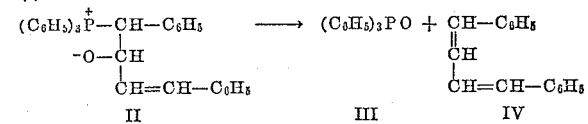

There is probably first formed an addition product from the phosphonium ylide I and the aldehyde to which may be ascribed the Formula II, and this then decomposes into the corresponding phosphine oxide III and the new unsaturated Compound IV. The ylide I may also be formulated as a methylene phosphine, for example $$(C_6H_5)_3P=CH-C_6H_5$$

Instead of triphenyl benzyl phosphonium bromide, there can be used as starting material other quaternary phosphonium salts of the general Formula V

V

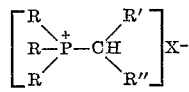

in which R represent aryl groups, in particular phenyl groups, and R' and R'' represent hydrogen or alkyl, cycloalkyl, aralkyl or aryl groups which may bear indifferent substituents and may contain isolated or conjugated double and/or triple linkages, and X stands for a halogen atom, in particular a chlorine or a bromine atom.

Quaternary phosphonium salts of the general Formula V are prepared by known methods, for example by reacting triphenyl phosphine, tritolylphosphine or diphenyltolyl phosphine with organic halides, such as methyl bromide, ethyl bromide, allyl bromide, cyclohexyl bromide, benzyl chloride, diphenyl methyl bromide, cinnamyl bromide, geranyl bromide, cyclogeranyl bromide, alpha and beta ionyl bromide, propargyl bromide, methoxybenzyl chlorides, chlorobenzyl chlorides, chloroacetic acid esters, chloroacetaldehyde diethyl acetal, or chloroaceto nitrile, monochloroethyl ether, chloroacetamide dibromethane, -propane or -butane or 1.4-dichlorobutene-(2), preferably by heating equivalent amounts of the components in an indifferent diluent, such as ethers or hydrocarbons, if necessary in a closed vessel.

The quaternary phosphonium salts are then reacted with equivalent amounts of a reagent which can remove hydrogen halide in order to convert it into the phosphonium ylide. Suitable reagents which can remove hydrogen halide are, for example, organo metallic compounds, such as methyl, phenyl, butyl, or tolyl lithium; phenyl, ethyl or tert. butyl magnesium halides, diethylamino magnesium chloride, sodium acetylide, sodium or potassium amides, alkali metal or alkaline earth metal alcoholates, such as sodium methylate or ethylate. The formation of the ylides is suitably carried out in inert solvents, such as ether, tetrahydrofurane or dioxane, preferably in an oxygen-free atmosphere.

The phosphonium ylides so produced are, generally speaking, instable compounds which react easily with oxygen and decompose while standing. It is preferred not to isolate them but to react them in situ with aldehydo or keto compounds.

The preparation of conjugated unsaturated compounds according to the principles of the instant invention comprises forming an addition compound of a phosphonium ylide in the manner heretofore described, said phosphonium ylide of the formula:

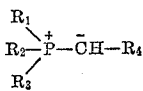

wherein $R_1$, $R_2$, and $R_3$ are monoaryl hydrocarbon substituents such as phenyl or toluyl groups and a carbonyl compound. In order to synthesize new compounds with conjugated unsaturation, at least one of (a) $R_4$ and the (b) the carbonyl compound must have ethylenic unsaturation on the carbon alpha to the —$\bar{C}$H— group and the carbonyl group, respectively. The new conjugated unsaturated compound is recovered by decomposing the addition compound into the corresponding phosphine oxide and the conjugated unsaturated compound, and separating the two.

Suitable aldehydo or keto compounds having ethylenic unsaturation on a carbon alpha to the carbonyl group are, for example, crotonaldehyde, cinnamic aldehyde, citral, ionone, pseudoionone, furfurol, alpha, beta unsaturated pyridine aldehydes and ketones; alpha, beta unsaturated dialdehydes and diketones, such as glyoxal, maleic dialdehyde, 2.6.11.15-tetramethylhexadekaheptaen-(2.4.6.8.10.12.14)-dial-(1.16), 4.9-dimethyldodekapentaen-(2.7.6.8.10)-dial-(1.12), and 2.7-dimethyloctadiene-(3.5)-dione-(2.7) can be reacted with two molecules of phosphonium ylides.

The conjugated unsaturation may also be provided by employing a triaryl phosphonium ylide whose reactive substituent has ethylenic unsaturation on the carbon alpha to the —CH— group attached to the phosphorus atom, viz.,

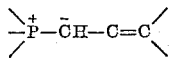

In this instance, the carbonyl compound may be any of the foregoing enumerated unsaturated carbonyl compounds or other carbonyl compounds such as acetaldehyde, benzaldehyde, acetone, cyclohexanone, acetophenone, benzophenone, p,p'-tetramethyldiaminobenzophenone, p,p'-dinitrobenzophenone, butine-(1)-one-(3), citronellal, camphor, ethyl acetoacetate, acetol, adipic dialdehyde, terephthalic and isophthalic dialdehydes, bromo malonic dialdehyde, acetyl acetone, acetonyl acetone, benzoyl acetone, dibenzoyl methane, 2.7-dimethyloctadiene-(3.5)-dial-(1.8), and 2.7-dimethyloctene-(4)-dione-(2.7).

The reaction of phosphonium ylides with aldehydes or ketones is carried out by adding the latter to the solutions or suspensions of the former, preferably while cooling. In order to decompose the primarily formed addition products of the type II into the phosphine oxide III and the desired unsaturated product, the reaction mixture may be heated for some time, for example at 30° to 100° C. After removing the phosphine oxide, for example by filtration, the reaction mixture can be worked up in the usual manner, for example by chromatography and/or by distillation or by recrystallization.

The new process permits the synthesis of many conjugated unsaturated compounds, some new or hitherto only accessible by troublesome methods, from readily acessible initial materials. It therefore has special importance for the synthesis of natural substances and medicaments or of intermediate products therefor.

The following examples will further illustrate this invention but the invention is not restricted to these examples. The parts are parts by weight.

*Example 1*

Methylene triphenyl phosphine $H_2C=P(C_6H_5)_3$ or triphenylphosphonium methylide $H_2C-P^+(C_6H_5)_3$ is first prepared in the following way:

The vapor of 50 parts of methyl bromide are led at about —10° C. while stirring and cooling into a solution of 100 parts of triphenyl phosphine in 150 parts of benzene. The mixture is stirred in an autoclave for an hour at room temperature and then for another 5 hours at 40° C. After cooling, the precipitated methyl triphenyl phosphonium bromide is filtered off by suction, washed with benzene, dried and finely ground. The yield is 118 parts; it melts at 228° to 230° C.

14.3 parts of methyl triphenyl phosphonium bromide are stirred under nitrogen into an ethereal solution of the equivalent amount of phenyl lithium. After stirring for about 3 hours at room temperature, the phosphonium salt is completely dissolved and a deep orange yellow solution of methylene triphenyl phosphine is formed from which in some cases it separates in the form of pale yellow crystals. The yield is practically quantitative.

*Example 2*

12 parts of cinnamaldehyde are added under nitrogen to a solution of 28 parts of methylene triphenyl phosphine in absolute ether. The mixture is heated for 3 hours in a closed vessel at 65° C. After cooling, the precipitate is separated by centrifuging. The ethereal solution is washed with water, then dried and freed from ether. The residue yields by fractional distillation 9 parts of 1-phenylbutadiene of the boiling point at 11 torr of 82° to 85° C. and melting point of 2° C.

*Example 3*

52 parts of triphenyl phosphine and 30 parts of allyl bromide in 65 parts of dry benzene are stirred first for 12 hours at room temperature and then for an hour under reflux. The allyl triphenyl phosphonium bromide is filtered off by suction after cooling, washed with benzene and dried. The yield amounts to 70 parts (corresponding to 92% of the theoretical yield); the melting point is 209° to 214° C.

1.67 parts of phenyl lithium in the form of a solution in absolute ether are added to a suspension of 7.7 parts of allyl triphenyl phosphonium bromide, ground as fine as dust, in 120 parts of absolute ether in an atmosphere of nitrogen while stirring. A deep red color immediately occurs, while the phosphonium salt gradually dissolves. After stirring for several hours, the red vinyl methylene triphenyl phosphine or triphenylphosphonium allylide has for the most part crystalllized out.

2.2 parts of benzaldehyde freshly distilled in a current of nitrogen are added under nitrogen to a suspension of 7.7 parts of vinyl methylene triphenyl phosphine in absolute ether, the ether thus being caused to boil and the red color gradually disappears. A thick pasty reaction mixture is obtained which is heated for 2 hours at 60° to 70° C. and then worked up as in Example 1. There are obtained 1.5 parts of 1-phenyl-butadiene of the boiling point 73° to 78° C. at 11 torr which is shown by the ultra-red spectrum and by reaction with maleic anhydride to be a mixture of about 65% of the trans form and about 35% of the cis form.

*Example 4*

A solution of 8.4 parts of phenyl lithium in absolute ether is allowed to flow gradually under nitrogen into a suspension of 38.9 parts of benzyl triphenyl phosphonium chloride in 120 parts of absolute ether. The solution immediately becomes colored red with slight spontaneous heating. The progress of the reaction may be followed by means of the Gilman test (with para.para'-tetramethyldiaminobenzophenone) which is positive so long as unconsumed phenyl lithium is still present. After 30 to 40 minutes the Gilman test is negative. In the meantime the benzylene triphenyl phosphine of triphenyl phosphonium benzylide has for the most part crystallized out.

To this suspension there is added gradually while stirring a solution of 13.2 parts of cinnamaldehyde in 25 parts of absolute ether. The mixture thus becomes decolored and a finely divided colorless precipitate separates out. The mixture is heated to boiling under reflux for 3 hours, filtered by suction after cooling and the filtrate worked up as in Example 1. There are obtained 16 parts of 1.4-diphenylbutadiene (corresponding to 78% of the theoretical yield) melting at 148° C. (after recrystallization from alcohol).

*Example 5*

A solution of 8.4 parts of phenyl lithium in absolute ether is added quickly to a suspension of 38.9 parts of benzyl triphenyl phosphonium chloride in 150 parts of absolute tetrahydrofurane. The phosphonium salt thereby passes rapidly into solution. The clear red solution contains benzylene triphenyl phosphine; in many cases it separates in the form of large red rhombohedrons.

Into the solution or suspension thus obtained, a solution of 13.2 parts cinnamaldehyde in 50 parts of absolute tetrahydrofurane is allowed to flow and the reaction mixture which has become colorless is heated for an hour at 60° C., the precipitate filtered off and the filtrate washed with 10% sulfuric acid and with water. After evaporating the solvent there remains behind 15.5 parts of 1.4-diphenylbutadiene melting at 148° C.

*Example 6*

A solution of 66 parts of ethyl magnesium bromide in 200 parts of absolute tetrahydrofurane is allowed to flow in the course of 30 minutes while stirring into a suspension of 195 parts of benzyl triphenyl phosphonium chloride in 300 parts of absolute tetrahydrofurane.

After stirring for about 3 hours the Grignard solution has been used up, while below the red solution of benzylene triphenyl phosphine a precipitate of magnesium bromide separates and can be filtered off.

Into the clear red solution 65 parts of cinnamaldehyde are allowed to flow while stirring, the vigorous reaction being moderated from time to time by cooling with ice-water. After stirring for 12 hours at room temperature, the precipitate is filtered off and the brown filtrate washed first with 10% sulfuric acid solution saturated with ammonium sulfate and then with saturated ammonium chloride solution. After evaporating the tetrahydrofurane there remain behind 75 parts of 1.4-di-phenylbutadiene melting at 147° to 149° C.

*Example 7*

A solution of 1 part of 2.7-dimethyloctatriene-(2.4.6)-dial-(1.8) in 50 parts of absolute tetrahydrofurane is allowed to flow gradually into a solution of benzylene triphenyl phosphine prepared from 3.9 parts of benzyl triphenyl phosphonium chloride as described in Example 5. The darkening solution soon deposits a colorless precipitate which is filtered off by suction after stirring for 5 hours. The filtrate is washed with 10% aqueous sulfuric acid saturated with ammonium sulfate and then with saturated aqueous ammonium chloride solution. The solution which is now orange-red is evaporated at reduced pressure. The residue is suspended in methanol, the precipitate filtered off by suction, washed with methanol and recrystallized from butanol. There are obtained 1.2 parts of fine orange-yellow needles melting at 199° to 200° C. which are shown by analysis and the ultra-violet spectrum to be 1.10-diphenyl-3.8-dimethyldecapentaene. It dissolves in concentrated sulfuric acid with a prussian blue color; the solution in chloroform gives with antimony trichloride at first a green color which changes to pale blue. The solution in tetrahydrofurane shows absorption bands at 385 millimicrons ($\epsilon=68,000$), 405 millimicrons ($\epsilon=104,000$) and 434 millimicrons ($\epsilon=93,000$).

*Example 8*

A solution of 43 parts of beta-cyclogeranyl bromide (=2.6.6-trimethylcyclohexene-(1)-yl-(1)-methyl bromide) in 20 parts of absolute benzene is gradually added at room temperature while stirring into a solution of 52 parts of triphenyl phosphine in 40 parts of absolute benzene. The mixture is heated for an hour at 60° C., then cooled with ice and the beta-cyclogeranyl triphenyl phosphonium bromide filtered off by suction. The yield of the product washed with benzene and dried at 50° C. under reduced pressure amounts to 90 parts; the melting point lies at 194° C.

A suspension of 9.6 parts of finely-ground beta-cyclogeranyl triphenyl phosphonium bromide in 120 parts of absolute tetrahydrofurane has added gradually to it under nitrogen an absolute ether solution containing 1.68 parts of phenyl lithium. The solution immediately becomes colored dark violet by the beta-cyclogeranylidene triphenyl phosphine formed.

After stirring for 2 hours, a solution of 2.2 parts of 2.7-dimethyloctadiene-(2.6)-ine-(4)-dial-(1.8), prepared according to Inhoffen and collaborators, Liebigs Annalen 580 (1953), page 7, in 50 parts of absolute tetrahydrofurane is allowed to flow gradually into the resultant deep violet solution. The mixture rapidly lightens while a voluminous pale brown precipitate is deposited. It is heated for about an hour at 60° C., the precipitate is filtered off by suction and the filtrate washed with 10% sulfuric acid saturated with ammonium sulfate and then with saturated ammonium chloride solution. The pale yellow solution is dried over sodium sulfate and evaporated under reduced pressure. The residue is taken up in a little petroleum ether and the solution chromatographed on activated aluminum oxide (prepared according to Brockmann). By eluating with petroleum ether, the more readily extractable reaction product is separated from the more difficulty migrating initial dialdehyde. The petroleum ether is evaporated off from the pale yellow extract at reduced pressure. 1.2 parts of a yellow oil are obtained which proves to be a mixture of the cis-trans isomeric forms of the $C_{30}$-hydrocarbon 1.10-bis-(2'.6'.6'-trimethylcyclohexene-(1')-yl-(1'))-3.8-dimethyl-decatetraene-(1.3.7.9)-ine-(5).

The solution of the oil in hexane shows in the ultra-violet spectrum bands at 239 millimicrons ($\epsilon=18,000$) and at 355 to 365 millimicrons ($\epsilon=41,000$). From a solution of the oil in a mixture of isoamyl alcohol and methanol there crystallize 0.21 parts of pale yellow needles melting at 101° to 102° C. which probably are the all-trans form of the hydrocarbon. The solution of these crystals in hexane shows a band at 358 millimicrons ($\epsilon=58,000$); the solution in chloroform gives with antimony trichloride a color reaction which is at first green but rapidly changes to blue.

*Example 9*

A solution of 4-methylhexine-(2)-ene-(4)-ylidene-(1)-triphenylphosphine is first prepared in the following way:

230 parts of alpha-methoxyethyl propargyl ether are allowed to flow gradually at 40° to 50° C. into a solution of ethyl magnesium bromide prepared in the usual way from 55 parts of magnesium and 218 parts of ethyl bromide in 800 parts of tetrahydrofurane. It is stirred for a further 30 minutes at 65° C., cooled to about 20° C. and into the resulting solution of alpha-methoxyethoxy propargyl magnesium bromide there are gradually allowed to flow 160 parts of methyl ethyl ketone. The mixture is heated to boiling under reflux for 1 hour and then poured onto a mixture of ice and saturated ammonium chloride solution. From the organic layer by the usual working up there are obtained 202 parts of 4-methyl-4-hydroxyhexine-(2)-yl-(1)-(alpha-methoxy)-ethyl ether of the boiling point 85° to 87° C. at 1 torr.

176 parts of this compound are dissolved in 150 parts of absolute toluene and 50 parts of anhydrous toulene. A mixture of 80 parts of phosphorus oxychloride and 50 parts of dry pyridine is allowed to flow in while stirring, the reaction mixture thus heating up to about 95° C. It is heated for another hour on a boiling waterbath and then poured while still hot and while stirring well onto a mixture of 300 parts of ice, 200 parts of 10% sulfuric acid and 250 parts of petroleum ether. The petroleum ether layer is separated, washed with water, dried over sodium sulfate and freed from the solvent under reduced pressure. In order to saponify any acetals present in the oily residue it is stirred for 1 hour at 40° C. with 150 parts of 10% sulfuric acid, then extracted with ether, the ether solution washed, dried, evaporated and the residue fractionally distilled. 47 parts of 1-hydroxy-4-methylhexine-(2)-ene-(4) are obtained as a colorless oil of the boiling point 55° C. at 1.2 torr.

47 parts of this alcohol are dissolved in 200 parts of dry benzene and while stirring and cooling a solution of 50 parts of phosphorus tribromide in 79 parts of dry benzene is gradually added at 5° C. The whole is stirred for 1 hour at room temperature, then poured onto ice, taken up with ether, the ethereal solution washed with water and dried over calcium chloride. After evaporating the ether there remain behind 35 parts of 1-brom-4-methylhexine-(2)-ene-(4).

55 parts of this bromine compound are stirred with 160 parts of absolute benzene and 95 parts of triphenylphosphine for 2 hours at 40° C. The precipitate formed is decanted and then suspended in tetrahydrofurane and stirred until it has become pulverulent. It is then filtered off by suction and dried at reduced pressure. The yield of 4-methyl-hexine-(2)-ene-(4)-yl-(1)-triphenyl phosphonium bromide amounts to 101 parts, corresponding to 66% of the theoretical yield. The melting point of the pure salt lies at 151° C.

22 parts of this phosphonium salt are suspended in finely ground form in 100 parts of anhydrous tetrahydrofurane. An absolute ethereal solution containing 4.2 parts of phenyl lithium is gradually stirred in under nitrogen, the mixture immediately becoming dark in color.

To the ylide solution thus obtained there are gradually added 10 parts of beta-ionone while stirring. The mixture becomes lighter and a yellowish-brown precipitate is thrown down. After stirring for 16 hours at room temperature, it is filtered off by suction and the filtrate worked up in the manner described in the foregoing examples. 9 parts of 11.12-dehydroaxerophthene of the boiling point 150° C. at 0.05 torr are obtained. Its solution in hexane shows a band at 313 millimicrons ($\epsilon$=32,000); the solution in chloroform gives a blue-violet color reaction with antimony chloride.

The reaction above proceeds in the manner generally outlined supra and is illustrated as follows:

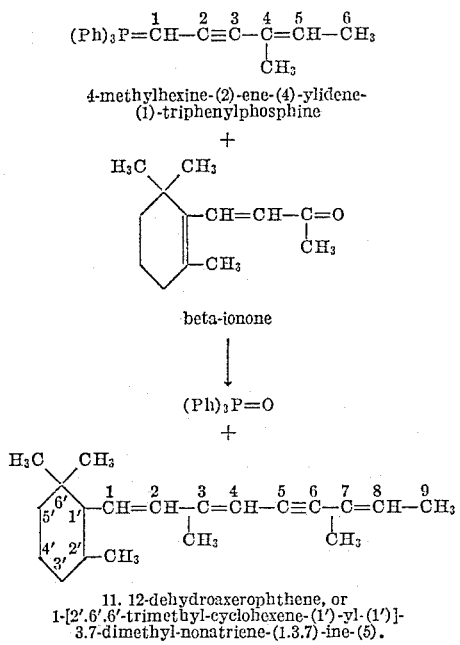

$$\overset{1}{(Ph)_3P}=\overset{2}{CH}-\overset{3}{C}\equiv\overset{4}{C}-\overset{5}{C}=\overset{6}{CH}-CH_3$$
$$\quad\quad\quad\quad\quad\quad\quad\quad\quad\quad |$$
$$\quad\quad\quad\quad\quad\quad\quad\quad\quad\quad CH_3$$

4-methylhexine-(2)-ene-(4)-ylidene-(1)-triphenylphosphine

+ beta-ionone

↓

$(Ph)_3P=O$

+

11.12-dehydroaxerophthene, or
1-[2′.6′.6′-trimethyl-cyclohexene-(1′)-yl-(1′)]-3.7-dimethyl-nonatriene-(1.3.7)-ine-(5).

Alternatively, by numbering the carbons in the cyclohexene radical as 1–6 and in the aliphatic group as 7–15, the compound may be named 7-[2.6.6-trimethyl-cyclohexene - (1) - yl-(i)]-9.13-dimethyl-nonatriene-(7.9.13)-ine-(11).

Axerophthene can be prepared from this dehydro compound in the following way: By hydrogenation with the aid of Lindlar catalyst (see Helvetica Chimica Acta 35 (1952) page 450) in benzene free from thiophene, 2 grams of dehydroaxerophthene absorb 170 cubic centimetres of hydrogen (corrected to normal conditions). After filtering off the catalyst, a granule of iodine is added to the solution and then the latter is shaken for 4 hours in bright daylight, then washed with sodium thiosulfate solution and with water and freed from benzene after drying. The residue is dissolved in petroleum ether and chromatographed on activated aluminum oxide (prepared according to Brockmann). The axerophthene gradually extracted with a large amount of petroleum ether shows in hexane solution a maximum at 320 millimicrons ($\epsilon$=46,000) and gives in chlorofrom solution a deep blue color reaction with antimony chloride.

*Example 10*

62 parts of 1.4-dichlorobutene-(2) are added to a solution of 400 parts of triphenylphosphine in 220 parts of absolute tetrahydrofurane. The mixture is heated to boiling under reflux for 16 hours. It is then cooled to room temperature and the 2-butene-1.4-bis-(triphenylphosphonium-chloride) filtered off by suction, washed carefully with tetrahydrofurane and dried at reduced pressure. The yield is 307 parts, corresponding to 94% of the theoretical yield. It melts at 264° C.

An absolute ether solution containing 3.8 parts of phenyl lithium is gradually allowed to flow under nitrogen into a suspension of 15 parts of finely powdered 2-butene-1.4-bis-(triphenyl-phosphonium - chloride) in 110 parts of absolute tetrahydrofurane, whereby a very dark solution of the bis-ylide is formed with marked spontaneous heating. After 30 minutes stirring, a solution of 15 parts of cinnamaldehyde in 10 parts of absolute tetrahydrofurane is gradually stirred in, whereby further spontaneous heating is observed. The reaction mixture is heated for a further 4 hours under reflux, then cooled and the dark solution filtered off by suction from the paler precipitate. The filtrate is washed as in the foregoing examples and leaves behind upon evaporation a dark oil which is again dissolved in a little tetrahydrofurane and applied to an aluminum oxide column (prepared according to Brockmann). It is eluated with tetrahydrofurane, the fraction first running through being collected as long as it gives a blue-violet color reaction with concentrated sulfuric acid. After evaporation of the tetrahydrofurane, the residue is triturated with methanol, the resultant 1.10-diphenyldecapentaene thereby forming a crystalline solid. After recrystallization from butanol it forms reddish needles melting at 251° to 253° C. Its solution in tetrahydrofurane shows bands at 377 millimicrons ($\epsilon$=66,000), 397 millimicrons ($\epsilon$=98,000) and 442 millimicrons ($\epsilon$=93,000).

*Example 11*

80 parts of a finely powdered benzyltriphenyl phosphonium chloride are introduced while stirring into a mixture of 50 parts of dry benzene and 8.4 parts of finely powdered sodamide. The phosphonium chloride passes into solution completely by further stirring at room temperature in the course of about 16 hours, while ammonia escapes and from the solution which becomes orange-red there separate sodium chloride and part of the benzylene-triphenyl phosphine in orange red crystals which rapidly effloresce. While cooling with ice, there is gradually added to the said reaction mixture a solution of 25 parts of cinnamaldehyde in 20 parts of dry tetrahydrofurane. Rapid decoloration thus takes place and a brown precipitate separates out. The mixture is heated for about an hour to boiling, the deposited sodium chloride and triphenyl phosphite oxide are filtered off by suction and the filtrate washed with 10% sulfuric acid which is saturated with ammonium chloride. The solvent is then distilled off under reduced pressure. The crystalline residue yields, after recrystallization from ethanol, 32 parts of 1.4-diphenylbutadiene melting at 148° to 149° C.

*Example 12*

11.6 parts of metallic sodium are dissolved at −45° C. in about 450 parts of liquid ammonia, 0.2 part of ferric nitrate is introduced and a slow current of air is led through the solution until the sodium has been completely converted into sodamide. Then there is gradually introduced while stirring a suspension of 80 parts of finely powdered benzyl triphenyl phosphonium chloride in 300 parts of dry tetrahydrofurane. After stirring for 24 hours at −50° C., a yellow solution of benzylene triphenylphosphine has been formed. The yield is practically quantitative. The solution can be reacted as such with cinnamaldehyde whereby 33 parts of 1.4-diphenyl-butadiene melting at 148° to 149° C. are obtained.

*Example 13*

A solution of 200 parts of benzyl triphenyl phosphonium chloride in 150 parts of absolute ethanol are rapidly introduced while stirring into a solution, heated to 20° to 30° C., of 11.5 parts of sodium in 150 parts of absolute ethanol. The mixture clouds immediately and becomes orange-red; after about 10 minutes it has the pH-value 7 to 8 and part of the ylide has precipitated in the form of red rhombohedrons which rapidly disintegrate to a white powder in the air. The yield is practically quantitative. By adding 70 parts of cinnamaldehyde, 87 parts of 1.4-diphenylbutadiene as well as triphenyl phosphine oxide are obtained in a rapid reaction; with 30 parts of acetone, 49 parts of 1-phenyl-2-methyl-propylene-(2) of the boiling point 78° to 79° C. at 15 torr are formed within 24 hours; and with 95 parts of benzophenone, 92 parts of 1.2.2-triphenylethylene melting at 61° to 620° C. are formed after boiling under reflux for 8 hours.

*Example 14*

122 parts of chloracetic acid ethyl ester are added to a solution of 260 parts of triphenylphosphine in 1300 parts of benzene. The mixture is boiled under reflux for 5 hours and the precipitated carbethoxymethyltriphenyl phosphonium chloride is then filtered off by suction, washed with benzene and dried. The yield is 340 parts and the melting point lies at 142° C.

A solution of 194 parts of this phosphonium salt in 400 parts of absolute ethanol is rapidly stirred into a solution of 11.5 parts of sodium in 150 parts of absolute ethanol at 20° C. There is thus obtained in almost a quantitative yield a solution of carbethoxymethylene triphenyl phosphine of the formula

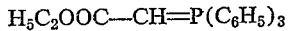

$$H_5C_2OOC-CH=P(C_6H_5)_3$$

which can be used for the following reactions:

With 70 parts of cinnamaldehyde there are obtained in a rapid reaction 80 parts of cinnamalacetic acid ethyl ester of the boiling point 135° to 140° C. at 0.01 torr, with 38 parts of crotonaldehyde 52 parts of sorbic acid ethyl ester of the boiling point 81° to 82° C. at 18 torr.

*Example 15*

75 parts of chloracetonitrile are added to a solution of 266 parts of triphenylphosphine in 900 parts of benzene. The mixture is heated to boiling under reflux for 8 hours and the cyanomethyltriphenyl phosphonium chloride which has crystallized out is filtered off by suction. The yield is 270 parts and the melting point lies at 244° C.

A solution of 175 parts of this phosphonium salt in 600 parts of absolute ethanol is stirred rapidly into a solution of 11.5 parts of sodium in 130 parts of absolute ethanol at about 20° C. After stirring for about 30 minutes, the formation of the ylide is practically complete; it partly separates from the solution as a colorless crystal powder which is probably an ethanol-addition product. The suspension, however, shows the reactions to be expected from the cyanomethylene triphenyl phosphine of the formula

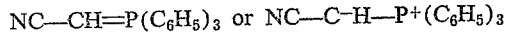

$$NC-CH=P(C_6H_5)_3 \text{ or } NC-C^-H-P^+(C_6H_5)_3$$

With 70 parts of cinnamaldehyde there are formed in a rapid reaction, besides triphenyl phosphine oxide, 57 parts of cinnamalacetonitrile of the boiling point 155° to 158° C. at 0.01 torr, with 38 parts of crotonaldehyde 36 parts of sorbic acid nitrile of the boiling point 61° to 62° C. at 15 torr, and with 80 parts of beta-ionone after 24 hours stirring 55 parts of beta-ionylidene acetonitrile, having the boiling point 118° to 120° C. at 0.5 torr.

*Example 16*

93 parts of chloracetamide are added to a solution of 266 parts of triphenyl phosphine in 900 parts of benzene. The mixture is heated for 8 hours under reflux to boiling and 300 parts of carbamidomethyl-triphenyl phosphonium chloride of the melting point 176° C. are obtained.

A solution of 180 parts of this phosphonium salt in 450 parts of absolute ethanol is stirred at 40° to 50° C. into a solution of 11.5 parts of sodium in 120 parts of absolute ethanol. The mixture, from which a colorless crystal powder is immediately precipitated, reacts neutral after 10 minutes. It contains in a practically quantitative yield the carbamidoethylene triphenyl phosphine of the formula $H_2N-CO-CH=P(C_6H_5)_3$ or its alcohol addition product which is shown by reaction with 40 parts of crotonaldehyde whereby in a rapid reaction there are obtained, besides triphenyl phosphine oxide, 33 parts of sorbic acid amide melting at 167° to 168° C.

*Example 17*

An ethereal solution of 0.4 part of methyl lithium is allowed to flow into a suspension of 9.6 parts of beta-cyclogeranyltriphenylphosphonium bromide in 120 parts of absolute tetrahydrofurane at a low rate in a nitrogen atmosphere, a dark-violet solution of beta-cyclogeranyl-identriphenylphosphine (i.e. triphenylphosphonium-beta-cyclogeranylide) being formed.

After 1 hour a solution of 1.5 parts of 2.7-dimethyl-octatriene-(2.4.6)-dial-(1.8) in 10 parts of tetrahydrofurane is added and the mixture is heated at 60° C. for 1 hour. Then the solvent is distilled off and the residue is extracted with petroleum ether. After filtering off the triphenylphosphine oxide, the yellow solution is passed through a column of aluminum oxide. By eluating the broad yellow zone with ether a yellow oil is obtained, which crystallizes by trituration with alcohol and, when recrystallized from alcohol, forms needles of 1.10-bis-(2'.6'.6'-trimethylcyclohexene - (1') - yl)-3.8-dimethyl-dekapentaene-(1.3.5.7.9) which have a brilliant chrome yellow coloration and melt at 134° to 135° C. The yield is 2.4 parts. The solution of the compound in hexane shows an absorption band at 370 millimicrons ($\epsilon=72,000$).

The 2.7-dimethyloctatrien-(2.4.6)-dial-(1.8) used in the reaction can be prepared in the following manner:

Into 940 parts of maleic dialdehyde tetraethyl acetal to which 0.6 part of boron trifluoride-etherate have been added, 700 parts of propenyl ethyl ether are allowed to flow at 45° C. while stirring and discharging the reaction heat. Heating is continued for about 30 minutes at 40° C.; then the reaction mixture is neutralized with dibutylamine and distilled under reduced pressure, 1100 parts of 2.7-dimethyl-1.1.3.6.8.8-hexaethoxyoctaene (4) being obtained having a boiling point of 130° to 135° C. at a pressure of 0.2 torr. This product is dissolved in 1000 parts of benzene and heated, after adding 3 parts of para-toluene sulfonic acid, until alcohol is no longer split off. After distilling off the benzene a crystalline residue is left which is recrystallized several times from tetrahydrofurane in the presence of charcoal. 310 parts of the 2.7-dimethyloctatrien-(2.4.6)-dial-(1.8) wanted are obtained in the form of coarse yellow needles melting at 161° to 162° C. Its hexane solution shows absorption bands at 328 millimicrons ($\epsilon=54,000$) and at 341 to 342 millimicrons ($\epsilon=50,000$).

*Example 18*

A solution of 20 parts of phosphorus tribromide in 30 parts of absolute ether is allowed to flow into a solution of 20 parts of beta-ionol in 80 parts of absolute ether by small portions, while stirring and cooling at 10° C., the mixture is further stirred for 6 hours, poured on ice and the ethereal layer is thoroughly washed with water. The ether is evaporated after drying this layer with calcium chloride and the residue is mixed with 24 parts of triphenylphosphine. The resulting mixture is melted on the waterbath, 80 parts of tetrahydrofurane are added and the whole is heated for 2 hours with reflux.

When the solution of the resulting phosphonium salt has cooled, an ethereal solution of 0.15 part of methyl lithium is added with the mixture assuming a dark-violet coloration. After 2 hours a solution of 1 part of 4.9-dimethyldodekapentaen-(2.4.6.8.10)-dial-(1.12) in 20 parts of tetrahydrofuran is added to the solution of the triphenylphosphonium-beta-ionylide so obtained, the mixture taking an almost black coloration. After stirring for 2 hours at 60° C. the tetrahydrofuran is distilled off at reduced pressure. The residue is extracted with a mixture of 30 parts of benzene and 70 parts of petroleum ether. After filtering off the triphenylphosphine oxide, the solution is passed through a column of aluminum oxide and chromatographed. Following a colorless forerun, a mixture of isomeric beta-carotenes is obtained which can be converted into pure all-trans-beta carotene (melting point 178° to 179° C.) in conventional manner, for example by boiling the solution with a trace of iodine and chromatographing again.

The 4.9 - dimethyldodekapentaen - (2.4.6.8.10) - dial-(1.12) used for the synthesis can be prepared as follows:

280 parts of 2.7-dimethyloctatriene-(2.4.6)-dial-(1.8) prepared as described in the last paragraph of Example 17, are dissolved in 580 parts of ethyl ortho-formate. After adding a solution of 8 parts of ammonium nitrate in 580 parts of absolute ethanol, the combined solutions are heated to boiling for 1 hour with reflux and diluted with ether after cooling. The dark-brown solution is then washed with a dilute solution of sodium bicarbonate. After drying with potassium carbonate the solvents and the unreacted ethyl ortho formate are distilled off. By distilling the residue under a pressure of 0.03 torr, 410 parts of 1.1.8.8-tetraethoxy-2.7-dimethyloctatriene-(2.4.6) pass over at between 127° and 128° C.

To this 0.4 part of boron trifluoride etherate is added and then, at a temperature of 40° to 45° C., 170 parts of vinyl ethyl ether are stirred in by portions, any rise of temperature above 45° C. being prevented by cooling. The reaction mixture is processed as described in the last paragraph of Example 17, whereby 125 parts of 4.9-dimethyldodekapentaene - (2.4.6.8.10)-dial-(1.12) are obtained in the form of yellow needles. Recrystallized from alcohol and tetrahydrofuran the needles melt at 173° to 174° C. Their methanolic solution shows absorption bands at 377 millimicrons ($\epsilon=64{,}000$) and at 398 to 399 millimicrons ($\epsilon=58{,}000$).

*Example 19*

A solution of 3 parts of 2.6.11.15-tetramethylhexadecaheptaene-(2.4.6.8.10.12.14)-dial-(1.16) in 50 parts of tetrahydrofuran is combined, while stirring, in a nitrogen atmosphere, with a solution of beta-cyclogeranylidene triphenyl phosphine in tetrahydrofuran prepared as described in paragraph 1 of Example 17 from 9.6 parts of beta-cyclogeranyltriphenylphosphonium bromide and 0.4 part of methyl lithium. The deep dark opalescent solution is stirred at 50° C. for 3 hours. The solvent is then distilled at reduced pressure in a nitrogen current and the residue is triturated with some absolute ethanol. 2.8 parts of red crystals are obtained which when recrystallized from a benzene-ethanol mixture melt at 178° to 179° C. and consist of pure all-trans-beta-carotene. Its solution in hexane shows absorption bands at 452 millimicrons ($\epsilon=148{,}000$) and at 481 millimicrons ($\epsilon=136{,}000$).

The 2.6.11.15-tetramethylhexadecaheptaene-(2.4.6.8.10.12.14)-dial-(1.16) used in the aforesaid carotene synthesis can be prepared as follows:

100 pairs of 4.9-dimethyl-dodecapentaene-(2.4.6.8.10)-dial-(1.12), prepared as described in the last paragraph of Example 18, are mixed with 200 parts of ethyl ortho formate and a solution of 8 parts of ammonium nitrate in 200 parts of absolute ethanol. The mixture is heated to boiling under reflux for 2 hours and, after cooling, diluted with ether. The red-brown solution is washed with a solution of sodium bicarbonate and dried with potassium carbonate, whereafter the solvents and the excess of ethyl ortho formate are distilled off at reduced pressure. The residue (180 parts) substantially consists of 1.1.12.12-tetraethoxy-4.9-dimethyldodecapentaene-(2.4.6.8.10). To avoid decomposition it is not distilled but further processed as it is by adding 0.8 part of boron fluoride etherate and then combining the whole with 100 parts of propenyl ethyl ether by portions at 55° to 60° C. while stirring. The reaction mixture is processed similarly as described in the last paragraph of Example 17, whereby 30 parts of the 2.6.11.15-tetramethyl hexadecaheptaene - (2.4.6.8.10.12.14) - dial - (1.16) are obtained which after recrystallization from ethanol and tetrahydrofuran forms brick-red flat needles melting at 194° to 195° C. Its methanolic solution shows absorption bands at 340 millimicrons ($\epsilon=103{,}000$) and at 458 millimicrons ($\epsilon=92{,}000$).

*Example 20*

82 parts of gamma-bromo-beta-methylcrotonic acid methyl ester are added while stirring to a solution of 140 parts of triphenylphosphine in 1000 parts of absolute ether. After a short time the phosphonium salt begins to separate. After stirring for 12 hours at room temperature, its formation is completed. The yield amounts to 195 parts and the melting point lies at 160° C.

A solution of 98 parts of this phosphonium salt in 200 parts of absolute ethanol is allowed to run rapidly into a solution, stirred under nitrogen at 20° C., of 4.6 parts of sodium in 80 parts of absolute ethanol. The mixture becomes intense yellow; after 4 minutes it is already neutral to an alcoholic phenolphthalein solution.

44 parts of beta-ionylidene-acetaldehyde are allowed to flow into the resultant solution of the ylide rapidly with further stirring, the mixture thus being heated up somewhat and discolored. After stirring for 2 hours at room temperature, the alcohol is largely evaporated under reduced pressure in a current of nitrogen. The residue is taken up with ether. The ethereal solution is washed first with 10% sulfuric acid and then with water. Part of the triphenylphosphine oxide formed thereby crystallizes out and is filtered off by suction. The ethereal filtrate is freed from ether. The residue, which is partly crystalline, is then digested with petroleum ether, the triphenylphosphine oxide remaining undissolved is filtered off by suction and the petroleum ether solution is filtered through a short column of aluminum oxide. By evaporating the solvent 45 parts of a yellow-red oil are left which mainly consists of vitamin-A-acid methyl ester.

The solution of the ester in petroleum ether can be chromatographed on active aluminum oxide (by the method of Brockmann) for further purification. Elution is carried out with a mixture of petroleum ether and benzene (7:3) and after evaporating the extract in vacuo, 30 parts of the pure ester are obtained of which the hexane solution shows an absorption maximum at 350 millimicrons ($\epsilon=48{,}000$); its solution in chloroform gives with antimony trichloride a wine-red coloration with a violet edge.

By saponifying the ester in conventional manner the trans-vitamin-A-acid melting at 178° to 179° C. is obtained; the yield is 26 parts.

*Example 21*

21 parts of beta-ionylidene ethyl bromide (prepared by reaction of beta-ionylidene ethanol with phosphorus tribromide in absolute ether at 5° to 20° C.) are stirred with 24 parts of triphenylphosphine and 80 parts of absolute ethanol for 24 hours at room temperature. The solution is then heated for 20 minutes to boiling under reflux, cooled and the cold solution of the resultant phosphonium salt is stirred into a cold solution of 2.1 parts of sodium in 40 parts of absolute ethanol whereby the dark-colored corresponding phosphonium ylide is formed. After 10 minutes the reaction is finished which can be seen by the fact that the solution reacts neutral to phenolphthalein.

A solution of 8 parts of 2.7-dimethyloctadiene-(2.6)- ine-(4)-dial-(1.8) in some absolute alcohol is then allowed to flow in, the solution being immediately colored an orange-red. After stirring for 2 hours at room temperature, it is heated for 10 minutes to boiling under reflux and then the alcohol is largely distilled off under reduced pressure. The residue is taken up with ether, the ethereal solution washed with water and the ether evaporated off again. An oil permeated with crystals is left which is digested with petroleum ether. The triphenyl phosphine oxide which remains undissolved is filtered off and the petroleum ether solution is chromatographed on aluminum oxide. Three zones are thus formed; the bottom zone, rose in color, contains 15.15'-dehydro-beta-carotene; the top zone contains unchanged dialdehyde (V) and is yellow, whereas the middle zone (orange-yellow) apparently contains the product condensed on only one side.

The bottom zone is cut out and again chromatographed on deactivated aluminum oxide. The petroleum ether extract is evaporated in vacuo. A deep red oil is left which is taken up with some carbon disulfide. This solution is combined with three times its volume of absolute ethanol and the carbon disulfide is carefully evaporated under reduced pressure until the solution begins to turn opaque and settle out in flocks. It is placed in a refrigerator and kept there at minus 10° C. for 24 hours. Pale red needles are separated which after recrystallization from a mixture of benzene and methanol melt at 154° to 155° C.

The 15.15'-dehydro-beta-carotene thus obtained exhibits the known characteristic properties: its solution in chloroform, by the addition of antimony trichloride, gives a color reaction which from green gradually changes to blue; its hexane solution shows two absorption bands at 433 to 434 millimicrons ($\epsilon$=110,000) and at 458 millimicrons ($\epsilon$=90,000).

By selective catalytic hydrogenation, followed by an isomerization, for example by means of some iodine (cf. Liebigs Annalen 570 (1950), 68) beta-carotene melting at 179° C. can be obtained from the 15.15'-dehydrobeta-carotene.

We claim:

1. A process for the production of 11.12-dehydroaxerophthene of the formula:

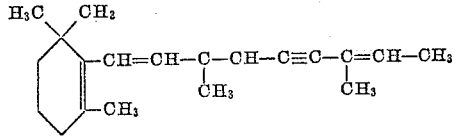

which comprises adding in the presence of an inert diluent in an oxygen-free atmosphere about the equivalent amount of a hydrogen halide-binding strong base selected from the group consisting of alkyl and aryl lithium, alkyl and aryl magnesium halides, alkali metal acetylides, amides and alcoholates to 4-methylhexine-(2)-ene-(4)-yl-(1)-triphenylphosphonium bromide, adding to the phosphonium ylide thus produced about the equivalent amount of beta-ionone heating at from about plus 30° C. up to about 100° C. until no more triphenylphosphine oxide is formed and removing the latter from the reaction mixture.

2. A process for the production of 15.15'-dehydrobeta-carotene which comprises adding in the presence of an inert diluent in an oxygen-free atmosphere about the equivalent amount of a hydrogen halide-binding strong base selected from the group consisting of alkyl and aryl lithium, alkyl and aryl magnesium halides, alkali metal acetylides, amides and alcoholates to beta-ionylideneethyl triphenyl-phosphonium bromide, adding to the phosphonium ylide thus produced about the equivalent amount of 2.7-dimethyl-octadiene-(2.6)-ine-(4)-dial-(1.8) heating at from about plus 30° C. up to about 100° C. until no more triphenylphosphine oxide is formed and removing the latter from the reaction mixture.

3. A process for the production of vitamine-A-acid which comprises adding in the presence of an inert diluent in an oxygen-free atmosphere about the equivalent amount of a hydrogen halide-binding strong base selected from the group consisting of alkyl and aryl lithium, alkyl and aryl magnesium halides, alkali metal acetylides, amides and alcoholates to the quaternary phosphonium salt obtained by reacting gamma-bromo-beta-methylcrotonic acid lower alkyl esters with triphenyl-phosphine, adding to the phosphonium ylide thus produced about the equivalent amount of beta-ionylidene acetaldehyde heating at from about plus 30° C. up to about 100° C. until no more triphenylphosphine oxide is formed and removing the latter from the reaction mixture.

4. A process for the production of beta-carotene which comprises adding in the presence of an inert diluent in an oxygen-free atmosphere about the equivalent amount of a hydrogen halide-binding strong base selected from the group consisting of alkyl and aryl lithium, alkyl and aryl magnesium halides, alkali metal acetylides, amides and alcoholates to beta-ionyl-triphenylphosphonium bromide, adding to the phosphonium ylide thus produced about equivalent amounts of 4.9-dimethyl-dodekapentaene-(2.4.6.8.10)-dial-(1.12) heating at from about plus 30° C. up to about 100° C. until no more triphenylphosphine oxide is formed and removing the latter from the reaction mixture.

5. 11.12-dehydroaxerophthene of the formula:

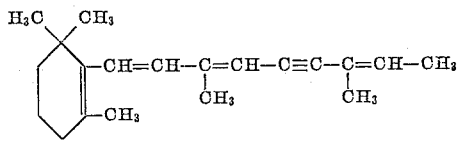

6. A process for the production of conjugated unsaturated compounds which comprises removing a hydrogen atom and a halide atom from the quaternary halide salt of a phosphonium compound having three monoaryl hydrocarbon substituents to produce a phosphonium ylide; adding an equivalent amount of a carbonyl compound having ethylenic unsaturation on a carbon alpha to the carbonyl group to the phosphonium ylide thus produced; and decomposing the addition products into the corresponding phosphine oxide and unsaturated compounds.

7. A process for the production of conjugated unsaturated compounds which comprises removing a hydrogen atom and a halide atom from a quaternary triphenyl phosphonium halide salt to produce a phosphonium ylide; adding an equivalent amount of aldehyde having ethylenic unsaturation on the carbon alpha to the carbonyl group to the phosphonium ylide thus produced; and decomposing the addition products into the corresponding phosphine oxide and unsaturated compound.

8. A process for the production of conjugated unsaturated compounds which comprises removing a hydrogen atom and a halide atom from a quaternary triphenyl phosphonium halide salt to produce a phosphonium ylide; adding an equivalent amount of a ketone having ethylenic unsaturation on a carbon alpha to the carbonyl group to the phosphonium ylide thus produced; and decomposing the addition products into the corresponding phosphine oxide and unsaturated compound.

9. A process for the production of 11,12-dehydroaxerophthene of the formula:

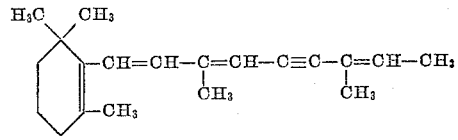

which comprises removing a hydrogen atom and a halide atom from 4-methylhexine-(2)-ene-(4)-yl-(1)-triphenylphosphonium bromide, adding to the phosphonium ylide thus produced about the equivalent amount of beta-ionone and removing the triphenylphosphine oxide from the reaction mixture.

10. A process for the production of 15,15'-dehydro-beta-carotene which comprises removing a hydrogen atom and a halide atom from beta-ionylidene-ethyl triphenylphosphonium bromide, adding to the phosphonium ylide thus produced about the equivalent amount of 2,7-dimethyl-octadiene-(2,6)-ine-(4)-dial-(1,8) and removing the triphenylphosphine oxide from the reaction mixture.

11. A process for the production of vitamine-A-acid which comprises removing a hydrogen atom and a halide atom from the quaternary phosphonium salt obtained by reacting gamma-bromo-beta-methyl-crotonic acid lower alkyl esters with triphenylphosphine, adding to the phosphonium ylide thus produced about the equivalent amount of beta-ionylidene acetaldehyde, removing the triphenylphosphine oxide from the reaction mixture and saponifying the vitamine-A-acid esters obtained.

12. A process for the production of beta-carotene which comprises removing a hydrogen atom and a halide atom from beta-ionyl-triphenylphosphonium bromide, adding to the phosphonium ylide thus produced about equivalent amounts of 4,9-dimethyl-dodekapentaene-(2,4,6,8,10)-dial-(1,12) and removing the triphenylphosphine oxide from the reaction mixture.

13. In a process according to claim 6 wherein the carbonyl compound is a di-carbonyl compound, and each carbonyl group is condensed with a mol of the quaternary halide salt of a phosphonium compound.

14. A process according to claim 13 wherein the di-carbonyl compound is a conjugated unsaturated dialdehyde with the aldehyde groups in the 1 and 8 positions.

15. A process for the production of 1.10-bis-(2'.6'.6'-trimethylcyclohexene-(1')-yl-(1'))-3.8-dimethyl-decatetraene-(1.3.7.9)-ine-(5), which comprises adding in the presence of an inert diluent in an oxygen-free atmosphere about the equivalent amount of a hydrogen halide-binding strong base selected from the group consisting of alkyl and aryl lithium, alkyl and aryl magnesium halides, alkali metal acetylides, amides and alcoholates to beta-cyclogeranylidene triphenylphosphonium bromide, adding to the phosphonium ylide thus produced about the equivalent amount of 2.7-dimethyl-octadiene-(2.6)-ine-(4)-dial-(1.8), heating at from about plus 30° C. up to about 100° C. until no more triphenylphosphine oxide is formed and removing the latter from the reaction mixture.

16. Triphenyl - [(2,6,6 - trimethyl - 1-cyclohexen-1-yl)-methyl]-phosphonium bromide.

17. A process for making triphenyl-[(2,6,6-trimethyl-1-cyclohexen-1-yl)methyl]-phosphonium bromide which comprises condensing triphenyl-phosphine with 1-bromomethyl-2,6,6-trimethyl-1-cyclohexene.

18. Triphenyl - [(2,6,6 - trimethyl-1-cyclohexen-1-yl)-methylidene]-phosphine.

19. A process of making triphenyl-[(2,6,6-trimethyl-1-cyclohexen-1-yl)methylidene]-phosphine which comprises reacting phenyl lithium with triphenyl-[(2,6,6-trimethyl-1-cyclohexen-1-yl)methyl]-phosphonium bromide to split out hydrogen bromide therefrom, thereby forming triphenyl-[(2,6,6-trimethyl-1-cyclohexen-1-yl)methylidene]-phosphine.

20. In a process for preparation of conjugated unsaturated compounds, forming an addition compound of a carbonyl compound and a phosphonium ylide of the formula:

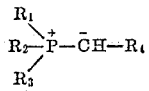

wherein $R_1$, $R_2$, and $R_3$ are monoaryl hydrocarbon groups and $R_4$ is a member selected from the group consisting of hydrogen and a monovalent, organic group, at least one of $R_4$ and the carbonyl compound having ethylenic unsaturation on a carbon alpha to the —C⁻H— and the carbonyl group, respectively; and decomposing the addition compound into the corresponding triaryl phosphine oxide and the conjugated unsaturated compound.

References Cited in the file of this patent

UNITED STATES PATENTS 2,525,568     Van Dorp et al. _____ Oct. 10, 1950

OTHER REFERENCES

Coffman et al.: Jour. Amer. Chem. Soc., vol. 51, No. 2, 1929, pp. 3496–3501.

Karrer et al.: Helv. Chim. Act., vol. 31, pp. 1048–1062 (1948).

Kosolapoff: Organo-phosphorus Compounds, pp. 78, 84 and 85 (1950).

Wittig et al: German application Ser. No. B33053, printed June 21, 1956.

UNITED STATES PATENT OFFICE
CERTIFICATE OF CORRECTION

Patent No. 3,078,256                                          February 19, 1963

Georg Wittig et al.

It is hereby certified that error appears in the above numbered patent requiring correction and that the said Letters Patent should read as corrected below.

Column 3, line 41, for "$H_2C-P^+(C_6H_5)_3$" read -- $H_2\overset{-}{C}-\overset{+}{P}(C_6H_5)_3$ --;

column 9, line 14, for "620° C." read -- 62° C. --.

Signed and sealed this 10th day of December 1963.

(SEAL)
Attest:

ERNEST W. SWIDER

Attesting Officer

EDWIN L. REYNOLDS

Acting Commissioner of Patents